UNITED STATES PATENT OFFICE.

LINA SCHÜLER, OF WHITESTONE, NEW YORK, ASSIGNOR TO MAX BACHERT, OF BOSTON, MASSACHUSETTS.

FIREPROOFING COMPOUND.

SPECIFICATION forming part of Letters Patent No. 502,867, dated August 8, 1893.

Application filed November 26, 1892. Serial No. 453,262. (Specimens.)

*To all whom it may concern:*

Be it known that I, LINA SCHÜLER, residing at Whitestone, Queens county, New York, have invented an Improved Fireproofing Composition, of which the following is a specification.

This invention relates to a new mixture by means of which all kinds of fabrics, wood and other things can be conveniently rendered fireproof.

The new composition consists of phosphate of ammonia and sulphate of ammonia, to which anhydrous chloride of calcium may if desired be added; but the addition of anhydrous chloride of calcium is not essential in most cases. The proportions which are found to be very effective for the purpose named are three parts by weight of phosphate of ammonia to one part by weight of sulphate of ammonia. But these proportions may be varied and modified according to circumstances, and I do not limit myself to the same. The ingredients named are solids. They can be usefully employed in connection with water, or with other liquids; for instance, for fireproofing ordinary fabrics, such as woven fabrics, paper and the like, I dissolve, say, one pound of the above mixture in one gallon of water, and then steep the fabric to be fireproofed into the liquid thus produced. After drying it will be found properly protected against danger from inflammation. For fireproofing wood or massive substances and hastening the penetration of the fireproofing composition into every portion thereof, I prefer to heat the mixture until steam is evolved, and to expose the wood or other substance to the steam in a closed chamber; it being found that after having been properly and thoroughly steamed, the whole mass is fireproof.

The composition may also be added to dyes for dyeing fabrics, so that they may be fireproofed in the act of dyeing. It may also be used in connection with oil-paints and the like, in which case the composition is ground in with the paint and then applied in the ordinary manner as a paint; it being found that the paint covering is thus made fireproof.

I have reason to believe, though I have not yet proved by actual experiment, that the carbons used in electric arc lights will when steeped in this preparation be less rapidly consumed than otherwise. I have also found that this composition when mixed with water serves as an excellent fire extinguisher, for I have demonstrated by experiment that when a vessel is filled with hydrocarbon liquid, such as kerosene oil, and the same then set on fire, the flame will be immediately extinguished when a stream of the composition mixed with water is applied. Therefore by the term fireproofing composition, I desire to have the fire extinguishing composition included in the term.

Having described my invention, what I claim, and desire to secure by Letters Patent, is—

As a new article of manufacture a fireproofing composition composed of phosphate of ammonia and sulphate of ammonia in a solidified form and in about the proportions specified.

LINA SCHÜLER.

Witnesses:
A. V. BRIESEN,
HARRY M. TURK.